United States Patent [19]

Finzel

[11] Patent Number: 4,778,243
[45] Date of Patent: Oct. 18, 1988

[54] CONNECTOR ELEMENT FOR A LIGHT WAVEGUIDE

[75] Inventor: Lothar Finzel, Munich, Fed. Rep. of Germany

[73] Assignee: Siemens Aktiengesellschaft, Berlin and Munich, Fed. Rep. of Germany

[21] Appl. No.: 121,042

[22] Filed: Nov. 16, 1987

[30] Foreign Application Priority Data

Dec. 8, 1986 [DE] Fed. Rep. of Germany ....... 3641838

[51] Int. Cl.$^4$ ............................................... G02B 6/38
[52] U.S. Cl. .............................. 350/96.21; 350/96.20; 350/96.22
[58] Field of Search ............... 350/96.17, 96.20, 96.21, 350/96.22

[56] References Cited

U.S. PATENT DOCUMENTS

| | | | |
|---|---|---|---|
| 4,146,301 | 3/1979 | Cherin et al. | 350/96.21 |
| 4,208,095 | 6/1980 | Malsot | 350/96.21 |
| 4,213,671 | 7/1980 | Lambert | 350/96.21 |
| 4,227,951 | 10/1980 | Mignien | 350/96.21 X |
| 4,276,113 | 6/1981 | Carlsen et al. | 350/96.21 X |
| 4,279,468 | 7/1981 | Turley et al. | 350/96.21 |
| 4,475,790 | 10/1984 | Little | 350/96.21 |
| 4,548,467 | 10/1985 | Stoerk et al. | 350/96.21 |
| 4,575,183 | 3/1986 | Parchet et al. | 350/96.22 |
| 4,593,972 | 6/1986 | Gibson | 350/96.21 |
| 4,657,341 | 4/1987 | Sammueller | 350/96.22 |
| 4,662,713 | 5/1987 | Davies et al. | 350/96.20 |
| 4,688,886 | 8/1987 | Stoërk | 350/96.21 |
| 4,725,114 | 2/1988 | Murphy | 350/96.21 X |

FOREIGN PATENT DOCUMENTS

| | | | |
|---|---|---|---|
| 0241724 | 10/1987 | European Pat. Off. | 350/96.22 |
| 2363986 | 7/1975 | Fed. Rep. of Germany | 350/96.21 |
| 3608019 | 9/1987 | Fed. Rep. of Germany | 350/96.22 |
| 54-139565 | 10/1979 | Japan | 350/96.21 |
| 54-160249 | 12/1979 | Japan | 350/96.22 |
| 54-160250 | 12/1979 | Japan | 350/96.22 |
| 57-53715 | 3/1982 | Japan | 350/96.21 |
| WO85/02025 | 5/1985 | PCT Int'l Appl. | 350/96.22 |
| WO86/02172 | 4/1986 | PCT Int'l Appl. | 350/96.21 X |

OTHER PUBLICATIONS

Satake et al., "Low-Loss Multifibre Connectors with Plug-Guide. Grooved Silicon "Elect. Lett. 10/81 vol. 17 No. 22 pp. 828-830.

Freeman, "Holding Fixture for Optical Fiber Array Connectors" West Elect. Tech. Dig. No. 52 10/78 pp. 7-8.

Primary Examiner—William L. Sikes
Assistant Examiner—Brian M. Healy
Attorney, Agent, or Firm—Hill, Van Santen, Steadman & Simpson

[57] ABSTRACT

A connector element for light waveguides has two carrier members which have guide grooves for the optical fibers and guide channels receiving guide ribs of guide rails for holding the two carrier members in alignment. To prevent possible misalignment due to micro-offsets in the surfaces of the guide channels and ribs of the guide rails or dust particles or the penetration of an immersion material into the guide channel, a portion of the contacting surfaces, either the contacting surface of the guide channel or of the guide rib is removed so that engagement between the rib and channel occurs only at spaced locations.

19 Claims, 3 Drawing Sheets

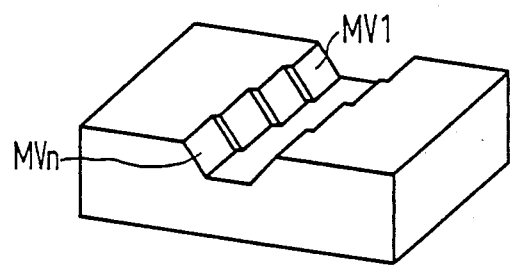
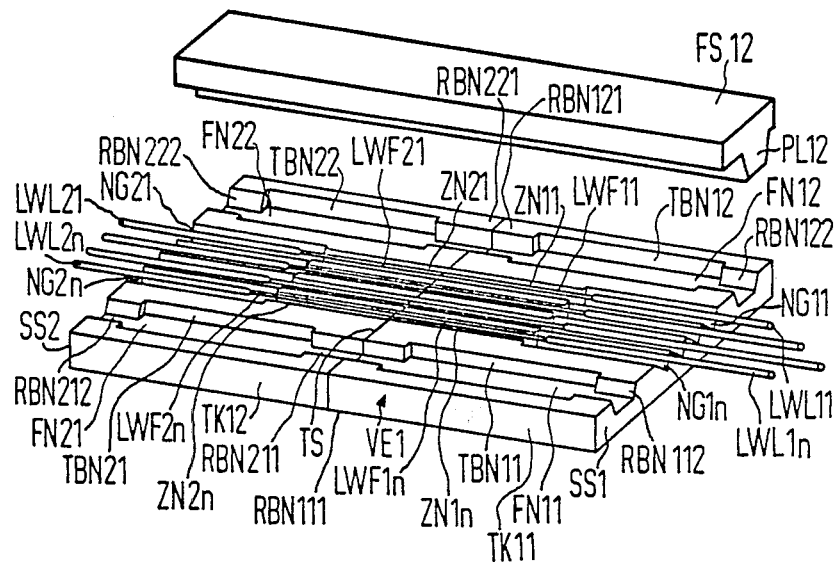

CONNECTOR ELEMENT FOR A LIGHT WAVEGUIDE

BACKGROUND OF THE INVENTION

The present invention is directed to a connector element for a plurality of light waveguides comprising two carrier members which are arranged in alignment along a parting surface relative to one another. Each of the carrier members has a plurality of V-shaped centering grooves extending parallel to each other to the parting surface for receiving individual optical fibers and also having guide channels along each side of the centering grooves which receive guide ribs of guide rails which extend between the two carrier members to hold the members in alignment with each other.

A connector element having two carrier members held in alignment by guide rails having ribs received in guide channels is disclosed in U.S. Pat. No. 4,657,341, whose disclosure is incorporated by reference and which claims priority from two German applications, including No. 34 08 783. In order to achieve a precise aligning arrangement of the two carrier members and their optical fibers with the carrier members being formed of silicon, each of the carrier members has etched V-shaped guide channels along their edges for receiving guide ribs of guide rails.

Problems occurred in manufacturing the side walls of the guide channels of the carrier members and of the guide ribs of the silicon guide rails. These problems involve micro-offsets MV1–MV2, as illustrated in FIG. 1. The difficulties occur because the side walls of the guide channel and of the profile ribs no longer rest against one another over a large surface area. The guide ribs, thus, no longer align the two carrier members exactly relative to one another so that the basic attenuation of the optical fibers can be increased due to misalignment.

In addition, the undefined point supports between the guide channels and the guide ribs, which occur due to the micro-offsets, are responsible for pressure and temperature sensitivity in the attenuation behavior of the silicon connector element. Also, superfine dust particles in the guide channel or immersion fluid which has penetrated into the guide channel will produce similar effects between the side wall parts of the channels and ribs.

SUMMARY OF THE INVENTION

The object of the present invention is to counter the problems occurring due to micro-offsets when etching or due to the penetration of extremely fine foreign bodies into the guide region in order to enable an exact alignment of the optical fibers.

These objects are achieved by an improvement in an optical connector element for a plurality of light waveguides comprising two carrier members which are arranged on a parting plane in alignment with each other, each of said carrier members having a plurality of V-shaped centering grooves extending parallel to each other and transversely spaced along the parting plane for accepting individual optical fibers and including guide channels on both sides of the centering grooves for receiving matched profile ribs of guide rails which extend across the parting surface and engage both members. The improvements are that one of the guide channels of the carrier members and the guide ribs of the guide rails have been treated so that either the guide channels are broadened in certain regions or the guide ribs guiding surfaces are removed in certain regions so that contact between the guide ribs and channels only occurs in the spaced apart remaining residual regions.

In one of the embodiments, the guide channels are broadened in at least one sub-range, so that the guide ribs of the rails are supported only in the remaining residual regions, which are spaced apart. Since it is only in the residual regions of the guide channels that the carrier member forms a support together with the guide ribs of the guide rails, the micro-offsets of the guide channels and guide ribs, as well as extremely small dust particles in the guide channels or immersion fluid, which penetrates into the guide channels, will lead to a far less or to no increase in the fundamental attenuation. An unusually high precision of the alignment of the individual connecting locations is achieved in this way. This also is not effected by external influences of the connector part, such as, for example, due to pressure and/or temperature.

According to a second embodiment of the invention, the advantages mentioned above are achieved in that the connector elements of the species initially cited have guide ribs of the guide rails, which are reduced in size in at least one subregion, to such a degree that the ribs are entirely omitted. Thus, only the remaining residual regions of the guide ribs will engage the guide channels of the carrier members.

Other features and advantages of the present invention will be readily apparent from the following description of the preferred embodiments, the drawings and claims.

BRIEF DESCRIPTION OF THE DRAWINGS

FIG. 1 is a perspective view of a channel in a silicon member showing the micro-offsets;

FIG. 2 is a perspective view of a connector element in accordance with the first embodiment of the present invention;

DESCRIPTION OF THE PREFERRED EMBODIMENTS

Figure 3:
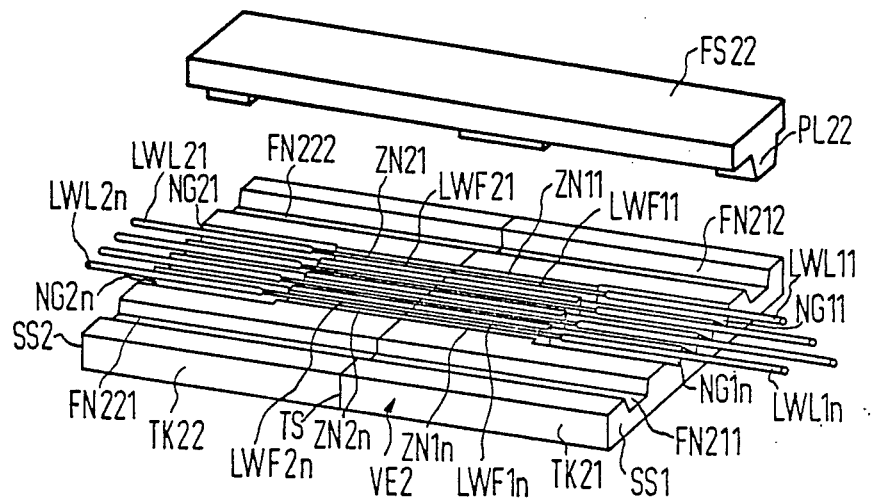
FIG. 3 is a perspective view of a connector element in accordance with the second embodiment of the present invention.

The principles of the present invention are particularly useful when incorporated into a connector element VE1, generally indicated in FIG. 2.

The connector element VE1 has two carrier members TK11 and TK12, which are identical and are advantageously composed of etchable material, preferably silicon. The two carriers TK11 and TK12 have end faces abutting against one another at a common parting location TS. The carrier member TK11 has a plurality of parallel-extending centering grooves ZN11–ZN1$n$, which, as illustrated, are spaced transversely across the parting location TS, and accept and center stripped optical fibers LWF11–LWF1$n$. In order to position the cladded portions of the fibers LWL1–LWL1$n$, each of the grooves ZN11-ZN1n merge into enlarged grooves NG11-NG1n. In a similar manner, the carrier member TK12 has parallel extending centering grooves ZN21-ZN2n, which receive the stripped optical fibers LWF21-LWF2n and these grooves ZN21-ZN2n merge with the enlarged grooves NG21-NG2n, which receive the cladded portion of the waveguides LWL21-LWL2n.

Aligning guide channels FN11 and FN12 are formed in the carrier member TK11, while guide channels FN21 and FN22 are formed in the carrier member TK12. These guide channels extend parallel to the centering grooves of each of the respective carrier members. When provided with the optical fibers, alignment of the two carier members TK11 and TK12 occurs with the guide channels, such as FN12 and FN22, receiving a guide rib PL12 of a guide rail FS12. The guide rib PL12 has a profile which is matched to the guide grooves, and the guide rail will bridge the common parting location or plane TS, so that the centering grooves ZN11 and ZN1n of the carrier member TK11 are aligned with the centering groovex ZN21-ZN2n of the carrier member TK12. Thus, the two groups of optical fibers LWF11-LWF1n will be aligned with the optical fibers LWF21-LWF2n.

In the embodiment illustrated, each of the guide channels FN11, FN12, FN21 and FN22 of the two carrier members TK11, TK12 are shown with a widened portion defined by etching in at least one sub-region, such as TBN11 and TBN12 or, respectively, TBN21 and TBN22, so that only the spaced apart remaining residual regions RBN111, RBN112, RBN121, RBN122 or, respectively, RBN211, RBN212, RBN 221, and RBN222 are provided for the actual guidance to form a seat together with the edges of the ribs, for example, the ribs PL12 of the guide rails FS12. The residual regions RBN111-RBN222, of the guide channels FN11, FN12, FN21 and FN22 provide the support of the profile of the guide rib, for example PL12, and are expediently trapezoidal in cross section and are matched so that the guide ribs contact occurs only at the lateral faces of the profile of the ribs. As a result of the greatly reduced seating surfaces between the edges of the guide channels and the guide ribs, the influences which produce a partial misalignment of the carrier members TK11 and TK12, such as, for example, the micro-offsets, which are produced during etching, the extremely fine dust particles or the immersion fluid which has penetrated into the guide channels are greatly eliminated.

A second embodiment of the connector element is generally indicated at VE2 in FIG. 3. The structure of the two carrier members TK21 and TK22 largely corresponds to that of the arrangement of the embodiment VE1 of FIG. 2, and identical parts are provided with the same reference characters. The significant difference, however, is that the guide channels FN211 and FN212 or, respectively, FN221 and FN222 of the two carrier members TK21 and, respectively, TK22, do not have the expanded sub-regions. By contrast, the profile of the guide ribs, for example PL22, of the guide rails, for example FS22, which are to be received in the guide channels, are not fashioned to be continuous.

Figure 4:
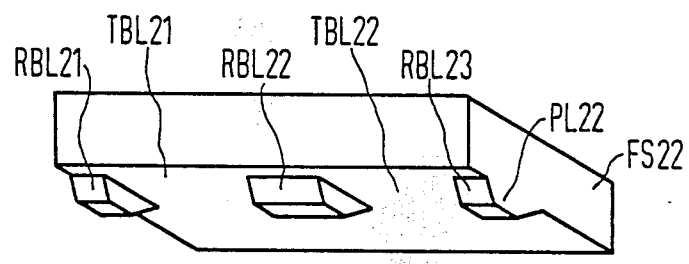
FIG. 4 is an enlarged perspective view of a guide rail in accordance with the second embodiment.

As best illustrated in FIG. 4, the profile of the rib PL22 for the guide rails FS22 comprises at least one sub-region, for example TBL21 and TBL22, which have been reduced to such a degree or completely eliminated by etching, that the carrier members TK21 and TK22 are now guided only by the remaining spaced apart residual regions, for example RBL21, RBL22 and RBL23 of the profile ribs PL22. These residual regions will then press against the side walls of the guide channels, such as FN211 and FN221. The residual regions, for example RBL21-RBL23, of the profile rib PL22, serve for seating and guidance and are preferably situated at the ends and in the middle of the guide rail FS22. The residual region RBL22, which is in the center region of the rail, serves mainly for aligning the carrier members TK21 and TK22 in the regions at both sides of the common abutting plane TS.

In both the embodiments, it should be noted that only one guide rail has been illustrated for purposes of clarity.

When, in the exemplary embodiment of FIG. 3, the guide rails, for example FS22, are placed into the guide channels, such as FN211 and FN221 or in the guide channels FN212 and FN222, then alignment of the carrier members TK21 and TK22 will occur only on the basis of the residual regions, for example RBL21-RBL23 of the ribs, for example the rib PL22. No contacting with the guide channels FN211-FN222 will occur in the remote sub-regions, for example the regions TBL21 and TBL22 of the rib PL22 so that the micro-offsets of the guide channels FN211-FN222, as well as the extremely fine dust particles or immersion fluids which have penetrated into the guide channels FN211 and FN222, will not deteriorate on exact alignment of the carrier members TK21 and TK22.

If desired, both the measure of broadening the guide channel, such as illustrated in FIG. 2, as well as recessing portions of the guide ribs, can be used simultaneously. The only requirement is that the broadening region occurs where the residual profile of the ribs remains.

Figure 5:
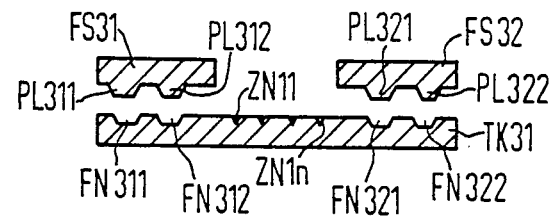
FIG. 5 is a cross sectional view showing a modification of the second embodiment of the present invention.

It is also possible to provide a plurality of guide channels FN311, FN312, FN321 and FN322, which extend parallel to one another on both sides of the centering grooves ZN11-ZN1n of the carrier member TK31, as illustrated in FIG. 5. The profile ribs PL311 and PL312 for a guide rail FS31 will cooperate with the channels FN311 and FN312, while the ribs PL321 and PL322 of the rail FS32 cooperate with the channels 321 and 322. The broadened parts of the guide channels, such as in FIG. 2 or the recesses in the profile of the ribs have been omitted for the purposes of illustration, however, one or the other or both would be utilized as mentioned hereinabove.

Figure 6:
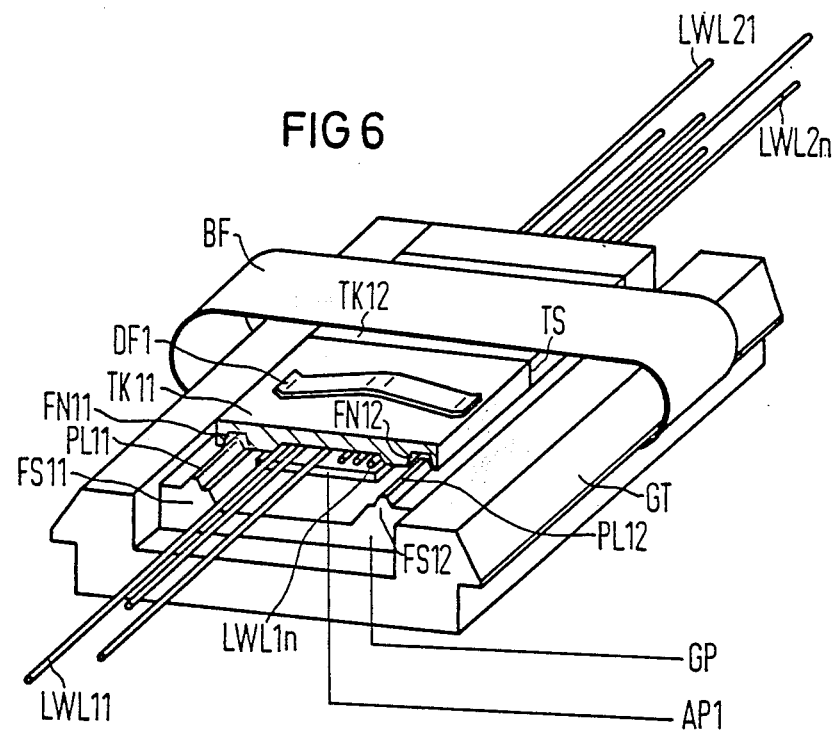
FIG. 6 is a perspective view of the connector element in accordance with the present invention in an outer connector housing.

A completed assembly connector element of the embodiment of FIG. 2 is illustrated in FIG. 6, however, the carriers TK11 and TK12 are mounted with the bottom surface on the top. The light waveguides LWL11-LWL1n or, respectively, LWL21-LWL2n, are situated between the carrier members TK11 or TK12 and a cover plate, for example AP1. The waveguides are fixed in position, for example, by an adhesive material and have their end faces abutting against one another at the parting location TS. The cover plates, for example AP1, are preferably composed of etchable material, for example, either silicon or glass. As a result of the profile ribs PL11 and PL12 of the guide rails FS11 and FS12 engaging into the guide channels, for example FN11, FN12, of the two carrier members TK11 and TK12, an exact alignment of the two carrier plate members TK11 and TK12 will occur. These guide rails FS11 and FS12, for example, are fixed on a common base plate GP with an epoxy resin. It is also possible that the guide rails FS11 and FS12, as well as the base plate, are a single unit of etchable material with the guide rails and their ribs being etched from this submember, which is, for example, formed of silicon, utilizing a suitable etching process. It also can be seen from FIG. 6 how the arrangement composed of the base plate GP guide rails FS11 and FS12 and the carrier members TK11 and TK12, together with the light waveguides LWL11-LWL1n, LWL21-LWL2n are arranged in a unit and fixed in the suitable base part or housing part GT. The base part GT used in this way is preferably manufactured of metal, for example, aluminum. For the purpose of fixing, the carrier members TK11 and TK12 carry compression springs, for example DF1, on their back surface opposite the fibers and these springs combine with shackle springs BF, which are slipped onto the base part GT to provide a uniform assembly of the overall arrangement.

Although various minor modifications may be suggested by those versed in the art, it should be understood that I wish to embody within the scope of the patent granted hereon all such modifications as reasonably and properly come within the scope of my contribution to the art.

I claim:

1. In a connector element for a plurality of light waveguides comprising two carrier members arranged in alignment on a parting plane, each of the carrier members having a plurality of V-shaped centering grooves extending parallel to each other and spaced transversely along the parting plane with the grooves accepting individual optical fibers, each of the carrier members having guide channels on both sides of the centering grooves, and guide rails having matched profile ribs engaged in the channels to align the two carrier members with their V-shaped grooves, the improvement comprising at least the surfaces of one of the channels and the surfaces of the ribs being partially eliminated in sub-regions so that the remaining spaced apart residual surfaces of the channels and ribs form the seating surfaces for the alignment rail and channels.

2. In a connector element according to claim 1, wherein the surfaces that are removed are the surfaces of the channels by broadening the channels in selected sub-regions.

3. In a connector element according to claim 2, wherein the residual regions of the channels serve the purpose of forming guiding surfaces for engaging the ribs of the guide rails.

4. In a connector element according to claim 1, wherein the surfaces are surfaces of the ribs, said only remaining surfaces of the ribs engage the surfaces of the guide channels to position the carrier members.

5. In a connector element according to claim 4, wherein one of the residual regions of the ribs engages the side faces of the channels on both sides of the parting location.

6. In a connector element according to claim 1, wherein a plurality of guide channels are provided on each side of the centering grooves and each of the guide rails has a plurality of ribs extending side-b-side for receiving in the channels.

7. In a connector element according to claim 6, wherein the ribs engaging in the guide channels on each side of the centering grooves are carried by a guide rail.

8. In a connector element according to claim 1, wherein the guide rails are secured to a common base plate by an adhesive.

9. In a connector element according to claim 1, wherein the guide rails are formed in a common base plate.

10. In a connector element according to claim 1, wherein both the guide ribs and the guide channels have portions of their surface removed so that only residual portions of each of the channels engages residual portions of the guide rails.

11. In a connector element for a plurality of light waveguides, said element comprising two carrier members with means for arranging the carrier members in alignment, each of said carrier members having a plurality of V-shaped, parallel-extending grooves spaced transversely across the member relative to a parting location for accepting of individual light waveguides and the means for aligning includes a guide channel provided on each side of each of the member for receiving a guide rib of a guide rail which extends across the two carrier members, the improvements comprising each of the guide channels having sub-regions which have been enlarged so that the guide rib is only received in spaced residual portions of the guide channel.

12. In a connector element according to claim 11, wherein the residual regions of the guide channel are adjacent the parting location and spaced therefrom.

13. In a connector element according to claim 11, wherein a plurality of guide channels extend along each side of the centering grooves, and each of the guide rails has a rib for each channel.

14. In a connector element according to claim 13, wherein the guide rail for each side is a common guide rail for the ribs engaging in the channels of said side.

15. In a connector element according to claim 11, wherein the guide rails are secured to a common base plate.

16. In a connector element for a plurality of light waveguides comprising said element having two carrier members and means for aligning the two carrier membes, each of said carrier members having a plurality of V-shaped centering grooves extending parallel to each other and being spaced transversely across the carrier member and relative to a parting location for the member, said means for aligning including a guide channel on both sides of the centering grooves and a guide rib received in each guide channel, said guide ribs extending across the parting location, the improvements comprising the guide rib being at least partially diminished in one sub-region so that only the spaced apart remaining residual regions engage the guide channels of the two carrier members.

17. In a connector element according to claim 16, wherein the residual regions are at each end of each guide rail and in the center region to bridge the parting location.

18. In a connector element according to claim 16, wherein each of the carrier members has a plurality of guide channels adjacent each side and each rail has a rib for the guide channels.

19. In a connector element according to claim 16, wherein each of the guide rails are spaced apart by a common base plate.

* * * * *